US011524706B2

(12) United States Patent
Kunihiro et al.

(10) Patent No.: US 11,524,706 B2
(45) Date of Patent: Dec. 13, 2022

(54) VEHICLE CONTROL SYSTEM FOR A FIRST AND SECOND AUTOMATED DRIVING MODE

(71) Applicant: Toyota Jidosha Kabushiki Kaisha, Toyota (JP)

(72) Inventors: Yoji Kunihiro, Susono (JP); Takahiro Kojo, Gotemba (JP); Shun Mizoo, Zama (JP); Takahiro Yokota, Susono (JP); Shunsuke Tanimori, Susono (JP); Hisaya Akatsuka, Susono (JP); Masaki Shiota, Shizuoka-ken Sunto-gun (JP); Hirotaka Tokoro, Inazawa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 61 days.

(21) Appl. No.: 16/840,827

(22) Filed: Apr. 6, 2020

(65) Prior Publication Data

US 2020/0324792 A1 Oct. 15, 2020

(30) Foreign Application Priority Data

Apr. 10, 2019 (JP) .............................. JP2019-075115

(51) Int. Cl.
*B60W 60/00* (2020.01)
*B60W 50/14* (2020.01)
*B60W 50/00* (2006.01)

(52) U.S. Cl.
CPC ........ *B60W 60/0053* (2020.02); *B60W 50/14* (2013.01); *B60W 2050/0071* (2013.01); *B60W 2050/143* (2013.01)

(58) Field of Classification Search
None
See application file for complete search history.

(56) References Cited

U.S. PATENT DOCUMENTS

| 10,471,969 | B1* | 11/2019 | Laserra Lima ... B60W 60/0053 |
| 2006/0235615 | A1 | 10/2006 | Kato et al. |
| 2012/0046817 | A1 | 2/2012 | Kindo et al. |
| 2014/0156134 | A1* | 6/2014 | Cullinane ............ G05D 1/0223 701/23 |

(Continued)

FOREIGN PATENT DOCUMENTS

| DE | 11 2010 002 279 T5 | 12/2012 |
| JP | 2006-318446 A | 11/2006 |

(Continued)

*Primary Examiner* — James J Lee
*Assistant Examiner* — Tawri M Matsushige
(74) *Attorney, Agent, or Firm* — Dinsmore & Shohl LLP

(57) ABSTRACT

An override conciliating portion executes processing to conciliate an override request during an execution of automated driving control (i.e., override conciliation processing). In the override conciliation processing, it is determined whether or not there is the override request (step S20). If the determination result of the step S20 is positive, it is determined whether or not a second automated driving mode is selected as an operation mode (step S21). If the determination result of the step S21 is negative, acceptance processing of the override request is executed (step S22). If the determination result of the step S21 is positive, invalidation processing of the override request is executed (step S23).

16 Claims, 13 Drawing Sheets

(56) References Cited

U.S. PATENT DOCUMENTS

| | | | |
|---|---|---|---|
| 2016/0001781 A1* | 1/2016 | Fung | G16H 50/20 |
| | | | 701/36 |
| 2017/0017233 A1* | 1/2017 | Ichikawa | B60W 60/0053 |
| 2017/0088145 A1* | 3/2017 | Gordon | G05D 1/0061 |
| 2017/0227959 A1* | 8/2017 | Lauffer | G05D 1/0061 |
| 2017/0240186 A1* | 8/2017 | Hatano | B60W 30/18163 |
| 2018/0215392 A1* | 8/2018 | Kosaka | G05D 1/0061 |
| 2018/0348758 A1* | 12/2018 | Nakamura | B60W 50/14 |
| 2019/0041850 A1* | 2/2019 | Chase | G08G 1/09675 |
| 2019/0086917 A1 | 3/2019 | Okimoto et al. | |
| 2019/0092341 A1* | 3/2019 | Stark | B60W 60/0054 |
| 2019/0204827 A1* | 7/2019 | Bhalla | B60W 50/14 |
| 2019/0210586 A1 | 7/2019 | Aizawa et al. | |
| 2019/0311207 A1* | 10/2019 | Oniwa | B60W 30/146 |
| 2020/0174470 A1* | 6/2020 | Park | B60W 60/0053 |
| 2020/0282984 A1* | 9/2020 | Mizoguchi | B60W 40/09 |
| 2020/0293034 A1* | 9/2020 | Shibata | G05D 1/0016 |
| 2020/0307641 A1* | 10/2020 | Oyama | B60W 40/08 |
| 2020/0398868 A1* | 12/2020 | Horii | G08G 1/16 |
| 2021/0146943 A1* | 5/2021 | Oniwa | B60W 50/085 |
| 2021/0237762 A1* | 8/2021 | Kuenzner | B60W 60/001 |

FOREIGN PATENT DOCUMENTS

| | | | | |
|---|---|---|---|---|
| JP | 2018-144782 A | 9/2018 | | |
| WO | 2017/158726 A1 | 9/2017 | | |
| WO | WO-2019046204 A1 * | 3/2019 | | B60W 50/14 |

* cited by examiner

VEHICLE CONTROL SYSTEM FOR A FIRST AND SECOND AUTOMATED DRIVING MODE

CROSS-REFERENCE TO RELATED APPLICATION

The present application claims priority under 35 U.S.C. § 119 to Japanese Patent Application No. 2019-075115, filed Apr. 10, 2019. The contents of this application are incorporated herein by reference in their entirety.

FIELD

The present disclosure relates to a vehicle control system mounted on a vehicle.

BACKGROUND

JP2006-318446A discloses a driving support device. This conventional device switches between an automated driving and a manual driving by an operation of a switch. The automated driving includes a full-automated driving and a half-automated driving. In other words, according to the conventional device, an operation mode is switched among the full-automated driving, half-automated driving and the manual driving by the operation of the switch.

SUMMARY

The automated driving is realized by executing automated driving control. As an operation mode for executing this automated driving control, consider a case where two selectable automated driving modes are prepared. In this case, one of the automated driving modes is expected to have a relatively higher reliability to the automated driving control than the other of the automated driving mode.

Consider a case where that a driver performs an override of the automated driving control in a vehicle where the two automated driving mode are applied. In this case, if an ease of the override is equivalent between the two automated driving modes, the following problem arises. That is, if the override is able to be performed too easily in the highly reliable automated driving mode, the driver may feel strangeness. The problem also arises when the override is not able to be performed in the low reliable automated driving mode.

It is an object of the present disclosure to provide a technique for suppressing the driver from feeling of the strangeness about the ease of the override during the execution of the automated driving control in the vehicle where the two automated driving mode are applied.

A first aspect of the present disclosures is a vehicle control system mounted on a vehicle.

The vehicle control system comprises a controller which is configured to execute automated driving control of the vehicle.

The controller is further configured to:
select a first or second automated driving mode as an operation mode for executing the automated driving control; and
during the execution of the automated driving control, execute override conciliation processing to conciliate an override request from the driver of the vehicle.

In the override conciliation processing, the controller is configured to:

determine which of the first and second automated driving mode is selected; and when it is determined that the second automated driving mode is selected, make it more difficult to accept the override request than a case where it is determined that the first automated driving mode is selected.

A second aspect of the present disclosure further has the following aspect in the first aspect.

When it is determined in the override conciliation processing that the second automated driving mode is selected, the controller is further configured to execute invalidation processing to invalidate the override request.

A third aspect of the present disclosure further has the following features in the second aspect.

The control system further comprises a detection device which is configured to detect the override request.

In the invalidation processing, the controller is further configured to substantially inhibit the override request from being input into the detection device.

A fourth aspect of the present disclosure further has the following feature in the second aspect.

In the invalidation processing, the controller is further configured to block the override request from being transmitted to a vehicle device as a target of the override request.

A fifth aspect of the present disclosure further has the following feature in the second aspect.

In the invalidation processing, the controller is further configured to prohibit the override request from being processed in the controller.

A sixth aspect of the present disclosure further has the following feature in the second aspect.

In the invalidation processing, the controller is further configured to prohibit a current traveling plan of the vehicle from being modified based on the override request.

A seventh aspect of the present disclosure further has the following feature in the second aspect.

In the invalidation processing, the controller is further configured to prohibit a switch of the operation modes based on the override request.

An eighth aspect of the present disclosure further has the following feature in the first aspect.

When it is determined in the override conciliation processing that the first automated driving mode is selected, the controller is further configured to accept the override request absolutely.

A ninth aspect of the present disclosure further has the following features in the first aspect.

The controller is further configured to execute alarm control for an occupant of the vehicle during the execution of the automated driving control.

In the alarm control, the controller is further configured to:
determine which of the first and second automated driving mode is selected; and when it is determined that the second automated driving mode is selected, an alarm level for the occupant is lowered as compared with that when it is determined that the first automated driving mode is selected.

A tenth aspect of the present disclosure further has the following feature in the first aspect.

The controller further configured to:
during the execution of the automated driving control, determine whether or not a cancel condition for canceling an execution of an invalidation processing to invalidate the override request is satisfied; and when it is determined that the cancel condition is satisfied, cancel the execution of the invalidation processing on a vehicle device belonging to a range of device type where the cancel condition is satisfied.

An eleventh aspect of the present aspect further has the following features in the tenth aspect.

The controller further configured to:

during the execution of the automated driving control, determine whether or not an exception condition for rejecting the cancellation of the execution of the invalidation processing is satisfied; and when it is determined that the exception condition is satisfied, reject the cancellation of the execution of the invalidation processing on a vehicle device belonging to a range of device type where the exception condition is satisfied.

According to the first aspect, the override conciliation processing is executed.

According to the override conciliation processing, when it is determined that the second automated driving mode is selected, the override request is made less acceptable than when it is determined that the first automated driving mode is selected. Therefore, in the vehicle where the first and second automated driving modes are applied, it is possible to suppress the driver from feeling of the strangeness about the ease of the override during the execution of the automated driving control.

According to the second to seventh aspects, when it is determined that the second automated driving mode is selected, the invalidation processing to invalidate the override request is executed. According to the invalidation processing, a driver intervention that may disturbance the automated driving control is eliminated. Therefore, it is possible to enhance controllability of the automated driving control.

According to the eighth aspect, when it is determined that the first automated driving mode is selected, the override request is absolutely accepted. Therefore, it is possible to leave a chance for the driver an intervention to the automated driving control.

According to the ninth aspect, the alarm control is executed. According to the alarm control, when it is determined that the second automated driving mode is selected, the alarm level is lowered as compared with that when it is determined that the first automated driving mode is selected. When the alarm level is lowered, it is expected that a frequency of the driver intervention for the automated driving control is reduced. Therefore, it is possible to enhance the controllability of the automated driving control.

According to the tenth aspect, when it is determined that the cancel condition is satisfied, the execution of the invalidation processing is canceled on the vehicle device belonging to the range of the device type where the cancel condition is satisfied. Therefore, even during the selection of the second automated driving mode, it is possible to leave to the driver the operation of the vehicle device belonging to the range of the device type where the cancel condition is satisfied.

According to the eleventh aspect, when it is determined that the exception condition is satisfied, the cancellation of the execution of the invalidation processing on the vehicle device belonging to the range of the device type where the exception condition is satisfied is denied. Therefore, even when the cancel condition is satisfied during the selection of the second automated driving mode, it is possible to execute the invalidation processing.

DESCRIPTION OF EMBODIMENTS

Embodiments of the present disclosure are described hereunder with reference to the accompanying drawings. However, it is to be understood that even when the number, quantity, amount, range or other numerical attribute of an element is mentioned in the following description of the embodiments, the present disclosure is not limited to the mentioned numerical attribute unless it is expressly stated or theoretically defined. Further, structures or steps or the like described in conjunction with the following embodiments are not necessary to embodiments of the present disclosure unless expressly stated or theoretically defined.

1. First Embodiment

First, a first embodiment will be described with reference to FIGS. 1 to 6.

1.1 Entire Configuration of Vehicle Control System

Figure 1:
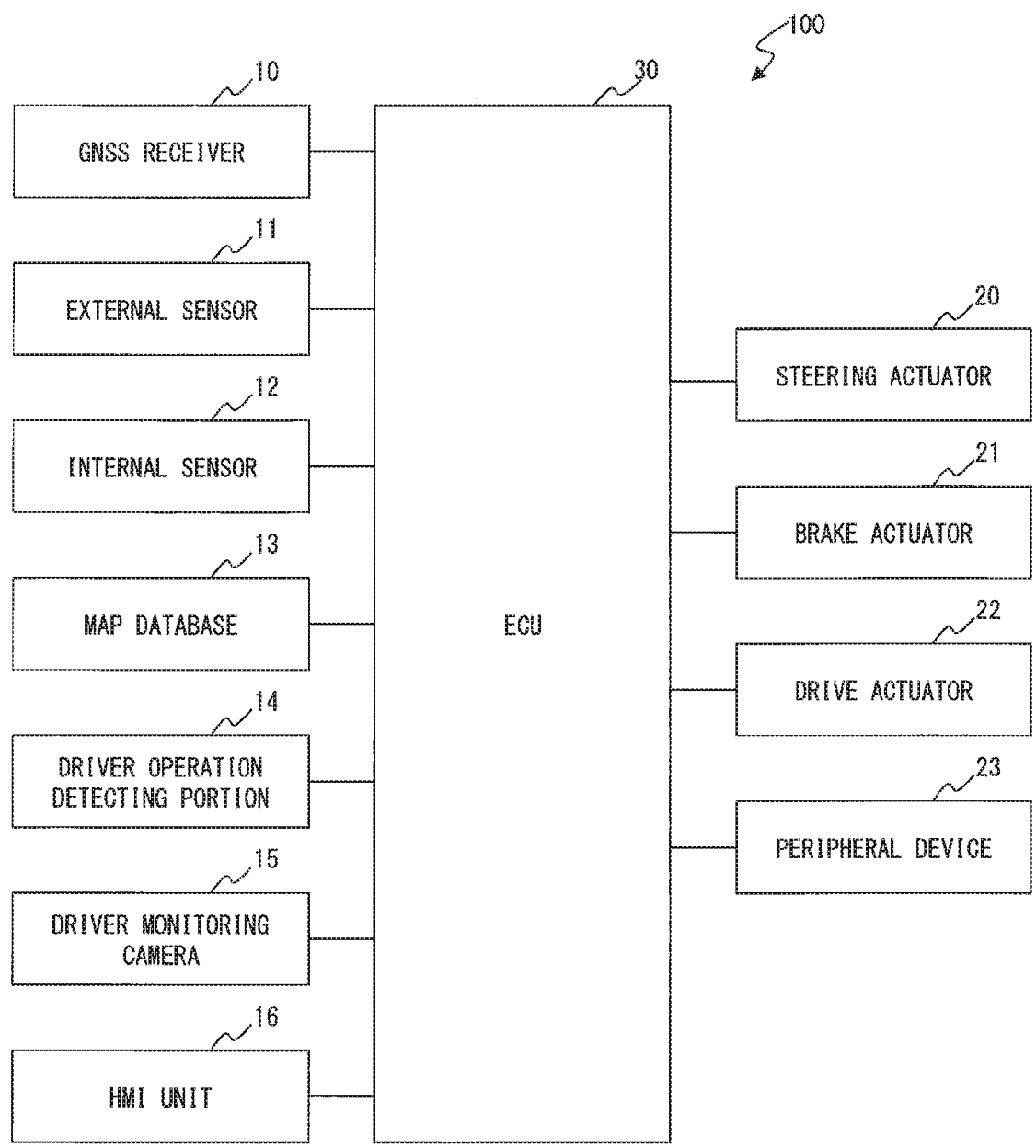
FIG. 1 is a block diagram showing a configuration example of a vehicle control system according to a first embodiment.

FIG. 1 is a block diagram showing a configuration example of a vehicle control system according to the first embodiment. A vehicle control system 100 shown in FIG. 1 is mounted on a vehicle. Examples of the vehicle include a vehicle using an engine as a power source, an electronic vehicle using a motor as the power source, and a hybrid vehicle including the engine and the motor. The motor is driven by a battery such as a secondary cell, a hydrogen cell, a metallic fuel cell, an alcohol fuel cell.

As shown in FIG. 1, the vehicle control system 100 is a system for executing the automated driving control of the vehicle. The vehicle control system 100 includes a GNSS (Global Navigation Satellite System) receiver 10, an external sensor 11, an internal sensor 12, a map database 13, a driver operation detecting portion 14, a driver monitoring camera 15, and a HMI (Human Machine Interface) unit 16.

A GNSS receiver 10 is a device which receives signals from three or more satellites. The GNSS receiver 10 calculates position and orientation of the vehicle based on the received signals. The GNSS receiver 10 transmits the calculated data to an ECU (Electric Control Unit) 30.

The external sensor 11 is a device which detects conditions around the vehicle. Examples of the external sensor 11 include a radar sensor and a camera. The radar sensors uses radio waves (e.g., millimeter wave) or lights to detect an obstruction around the vehicle. The obstruction includes a fixed obstruction and a moving obstruction. Examples of the fixed obstruction include a guard rail and a building. Examples of the moving obstruction include a walker, a bicycle and other vehicles. The camera captures an external condition of the vehicle. The camera is mounted, for example, on a back side of a windshield. The external sensor 11 transmits the detected data to the ECU 30.

The internal sensor 12 is a device which detects a traveling state of the vehicle. Examples of the internal sensor 12 include a vehicle speed sensor, an acceleration sensor, and a yaw rate sensor. The vehicle speed sensor detects traveling speed (i.e., vehicle speed) of the vehicle. The acceleration sensor detects acceleration of the vehicle. The yaw rate sensor detects yaw rate of a center of gravity of the vehicle around a vertical axis. The internal sensor 12 transmits the detected data to the ECU 30.

The map database 13 is a data base for storing map information. Examples of the map information include positional data of roads, information on road shape (e.g., road type such as straight and curve, and road curvature), and the positional data of intersections divergent points and constructions. The map information also includes information on traffic regulations. Examples of the information on traffic regulations include statutory speed associated with the positional data of roads. The map information may include information on regions where the automated driving control is able to be executed. The map database 13 is formed in a storage device (e.g., a hard disk or a flash memory) mounted on the vehicle. The map database 13 may be formed in a computer of a facility (e.g., a management center) that is capable of communicating with the vehicle.

The driver operation detecting portion 14 is a device which detects vehicle handling performed by a driver. Examples of the driver operation detecting portion 14 include a steering sensor, an accelerator pedal sensor, and a brake pedal sensor. The steering sensor includes a steering torque sensor and a steering touch sensor. The steering torque sensor detects steering torque of the driver on a steering wheel. The steering touch sensor detects a touch of the driver against the steering wheel and pressure at which the driver grips the steering wheel. The accelerator pedal sensor detects a depression of an accelerator pedal by the driver. The brake pedal sensor detects a manipulated variable of a brake pedal by the driver. The driver operation detecting portion 14 transmits the detected data to the ECU 30.

The driver operation detecting portion 14 also detects a signal which is output based on the manipulation by the driver and transmits the detected signals to the ECU 30. Examples of devices for outputting the signal based on the manipulation by the driver include a shift lever, an EPB (Electric Parking Brake) switch, a blinker switch, a door lock switch, an air conditioner switch, a light switch, an electric window switch, a wiper switch, a differential lock switch, a 4WD switch, and an ignition switch.

The shift lever selects combinations of gears in a transmission. The EPB switch switches a working status (e.g., ON and OFF) of an EPB. The blinker switch switches the working status (e.g., ON and OFF) of a directional indicator. The door lock switch switches a lock status (e.g., lock and unlock) of vehicle doors. The air conditioner switch switches an operating status (e.g., operation and stop) of the air conditioner. The light switch switches the working status (e.g., ON and OFF) of lights (e.g., headlights and fog lights). The electric window switch switches the working status (e.g., open and close) of windows provided in the doors. The wiper switch switches the working status (e.g., ON and OFF) of wipers. The differential lock switch switches the working status (e.g., ON and OFF) of a locking mechanism of a differential gear. The 4WD switch switches a driving system (e.g., 2WD and 4WD) of the vehicle. The ignition switch switches the working status (e.g., ON and OFF) of a power supply circuit of the vehicle.

The examples of devices for outputting the signal based on the manipulation by the driver also include a cancel switch of automated driving mode. The cancel switch switches the working status (e.g., ON and OFF) of the automated driving mode. In this embodiment, the automated driving mode is set as a default of an operation mode. When the cancel switch is pressed by the driver, the working status is switched from ON to OFF. When the cancel switch is pulled back by the driver, the working status is switched from OFF to ON (i.e., the working status is switched to the default status). A HMI unit 16 may be used as a device for switching the working status. An urgent special key may be used for switching the working status.

The driver monitoring camera 15 captures an occupant (i.e., driver) sitting on a driver's seat. The driver monitoring camera 15 is, for example, attached to a cover of a steering column. One or more driver monitoring cameras 15 may be provided for capturing the driver from a plurality of directions. The driver monitoring camera 15 transmits the captured data to the ECU 30.

The HMI unit 16 is an interface for providing information to the driver and for receiving information from the driver. The HMI unit 16 includes, for example, an input device, a display device, a speaker and a microphone. Examples of the input device include a touch panel, a keyboard, a switch and a button. The information provided to the driver include a driving status of the vehicle, a predetermined attention-seeking instruction, and a suggestion to switch from automated driving to manual driving (i.e., handover suggestion). The driver is informed by using the display device and the speaker. The reception of the data from the driver is performed by using the input device and the microphone. The HMI unit 16 transmits the data received from the driver to the ECU 30.

The vehicle control system 100 also includes a steering actuator 20, a brake actuator 21, a drive actuator 22 and a peripheral device 23. The steering actuator 20, the brake actuator 21, the drive actuator 22 and the peripheral device 23 are collectively referred to as a "vehicle device".

The steering actuator 20 forms a part of a rack-assisted, a column-assisted or a pinion assisted EPS (Electric Power Steering) device. The steering actuator 20 controls driving of a motor of the EPS device in response to control signals from the ECU 30, thereby controlling the steering torque of the vehicle.

The brake actuator 21 controls a brake device in response to the control signals from the ECU 30, thereby controlling a braking force applied to the steering wheel of the vehicle. Examples of the brake device include a hydraulic brake device.

The drive actuator 22 controls an air amount (throttle opening degree) supplied to the engine in response to the control signals from the ECU 30, and controls a driving force of the vehicle. In a case of the electronic vehicle, the control signals from the ECU 30 are input into the motor as the power source, and the driving force of the vehicle is controlled by the control signals. In a case of the hybrid vehicle, the air amount and the driving of the motor are controlled, thereby controlling the driving force of the vehicle.

The peripheral device 23 is a collective term used for various devices particularly relevant to the automated driving control. The peripheral device 23 constitutes one electrical system with each of the switches illustrated as the driver operation detecting portion 14. Examples of the peripheral device 23 include a shift actuator, an EPB actuator, a blinker, a door lock actuator, an air conditioner actuator, lights, a power window actuator, a wiper actuator, a differential gear lock mechanism, and a 4WD actuator.

The vehicle control system 100 further includes the ECU 30 as a controller. The ECU 30 is a microcomputer that includes a processor, a memory, an input interface and an output interface. The ECU 30 receives various kinds of data via the input and output interface. The ECU 30 executes the automated driving control based on the received data. Specifically, the ECU 30 plans a traveling plan of the vehicle and outputs data to the vehicle device so that the vehicle travels according to the traveling plan. Hereinafter, a configuration of the ECU 30 will be described.

1.2 Configuration of Controller

Figure 2:
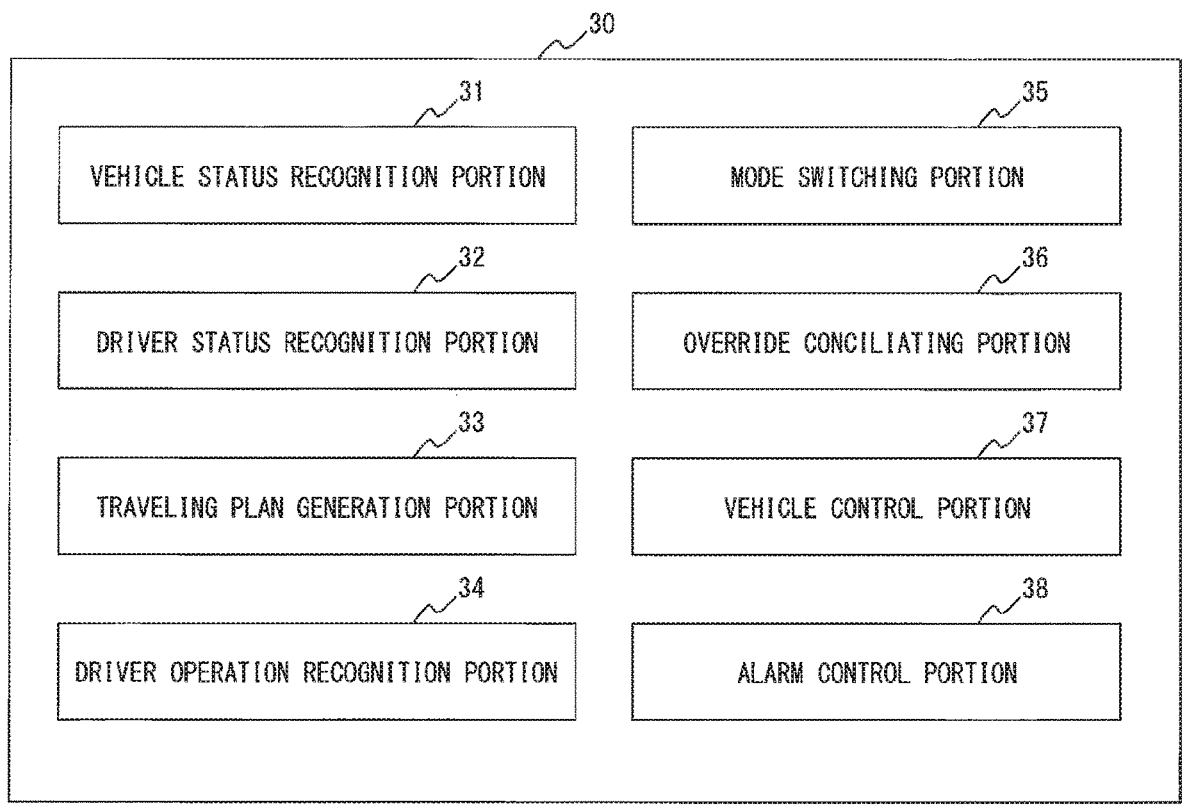
FIG. 2 is a block diagram showing a functional configuration example of a controller related to automated driving control.

FIG. 2 is a block diagram showing a functional configuration example of the ECU 30 related to the automated driving control. As shown in FIG. 2, the ECU 30 includes a vehicle status recognition portion 31, a driver status recognition portion 32, a traveling plan generation portion 33, a driver operation recognition portion 34, a mode switching portion 35, an override conciliating portion 36, a vehicle control portion 37, and an alarm control portion 38. These function blocks are realized when the processor of the ECU 30 executes various types of control programs stored in the memory.

The vehicle status recognition portion 31 recognizes a vehicle state. The vehicle state includes a position of the vehicle, a driving environment of the vehicle, a traveling state of the vehicle, and a status of the vehicle device.

The vehicle status recognition portion 31 recognizes the position of the vehicle on a map based on, for example, the positional data from the GNSS receiver 10 and the map information from the map database 13. The vehicle status recognition portion 31 recognizes the driving environment of the vehicle based on the data from the external sensor 11. The driving environment includes the position, the speed and moving direction of the obstruction relative to the vehicle. The vehicle status recognition portion 31 recognizes the traveling state of the vehicle based on the data from the internal sensor 12. The traveling state includes the vehicle speed, the acceleration, and the yaw rate. The vehicle status recognition portion 31 recognizes whether the vehicle device state is normal or abnormal based on data from the vehicle device. The vehicle status recognition portion 31 recognizes the working status of the vehicle device based on the data from the driver operation detecting portion 14.

The driver status recognition portion 32 recognizes a driver status. The driver state includes a gripping status of the steering wheel by the driver, an arousal level of the driver and a driving concentration level of the driver.

The driver status recognition portion 32 recognizes the gripping status of the steering wheel based on data from the driver operation detecting portion 14 (specifically, the steering torque sensor). The driver status recognition portion 32 recognizes the arousal level and driving concentration level based on the data from the driver monitoring camera 15. The arousal level and driving concentration level may be recognized based on the data from the driver operation detecting portion 14 (specifically, the steering touch sensor).

The traveling plan generation portion 33 sets a target route of the vehicle based on a preset destination, the position of the vehicle on the map recognized by the vehicle status recognition portion 31, and the map information from the map database 13. The preset destination may be set by the driver, or may be set automatically by the vehicle control system 100 according to well-known techniques. The target route is a route along which the vehicle travels by executing the automated driving control when the working status of the automated driving mode is selected as ON.

The traveling plan generation portion 33 generates a traveling plan of the vehicle based on the driving environment of the map information, vehicle of the target route, map database 13 and the traveling state of the vehicle. The traveling plan includes control target values of the vehicle in accordance with positions on the target route. The positions on the target route are positions in an extension of the target route. The positions on the target route means vertical positions set at every predetermined interval, for example, 1 m, in the extension of the target route. The control target values are control targets of the vehicle in the traveling plan. The control target values are set in association with each of the vertical positions on the target route. The control target value includes a target lateral location and a target vehicle speed.

The driver operation recognition portion 34 recognizes an involvement of the driver. Examples of the involvement of the driver include the manipulation of the steering wheel, the accelerator pedal and the brake pedal. The examples of the involvement of the driver also include the operations of the shift lever, the EPB switch, the blinker switch, the door lock switch, the air conditioner switch, the light switch, the electric window switch, the wiper switch, the differential lock switch, the 4WD switch and the ignition switch. The examples of the involvement of the driver also include the operation of the cancel switch.

The mode switching portion 35 executes processing to switch the operation mode (hereinafter also referred to as "switching processing"). Specific example of the switching processing will be described in detail in the section "1.3". Here, the operation mode will be described. The operation mode includes a manual driving mode and an automated driving mode. The manual driving mode is a mode at which the driver operates the vehicle. The automated driving mode is a mode at which the vehicle control system 100 operates the vehicle. That is, the automated driving mode is the mode in which automated driving control is executed. The automated driving mode includes a first automated driving mode and a second automated driving mode. In the following explanation, when simply referred to as the "automated driving mode", it means the "first or second automated driving mode".

Consider a case where the automated driving mode is selected as the operation mode (i.e., in the case of the default status). In this case, the mode switching portion 35 determines whether an execution condition of the automated driving mode is satisfied. The execution condition is preset for each of the first and second automated driving modes.

The execution condition of the first automated driving mode (hereinafter also referred to as a "first execution condition") includes a first vehicle condition which is satisfied depending on the vehicle state and a first driver condition which is satisfied depending on the driver status.

As the first vehicle condition, the following conditions V11 to V17 are exemplified.

V11: The vehicle is located on the region where the automated driving control is able to be executed.

V12: The vehicle speed is less than a threshold.

V13: The steering angle is less than a threshold.

V14: A variation of a vehicle motion (e.g., acceleration, deceleration, a roll rate, a pitch rate, and a yaw rate) is less than a threshold.

V15: A cognitive status of the external sensor 11 is normal.

V16: A status of the peripheral device 23 is normal.

V17: The vehicle doors and windows are closed.

As the first driver condition, the following conditions D11 to D13 are exemplified.

D11: The driver holds the steering wheel.

D12: The arousal level is greater than or equal to a threshold.

D13: The driving concentration level is greater than or equal to a threshold.

Likewise the first execution condition, the execution condition of the second automated driving mode (hereinafter also referred to as a "second execution condition") includes a second vehicle condition which is satisfied depending on the vehicle state and a second driver condition which is satisfied depending on the driver status.

As the second vehicle condition, a condition stricter than the first vehicle condition is set. The stricter condition than the first vehicle condition means that the thresholds of the conditions V11 to V17 (i.e., the determination values) are set to more stringent values and/or additional conditions are set. Therefore, if the second vehicle condition is satisfied, the first vehicle condition is also satisfied, but not vice versa. Therefore, in a case where the second vehicle condition is satisfied, the "reliability" for the automated driving control is said to be relatively higher than the case where the first vehicle condition is satisfied.

As the second driver condition, a condition stricter than the first driver condition may be set, or a condition equivalent to the first driver condition may be set. The stricter condition than the first driver condition means that the thresholds of the conditions D11 to D13 are set to more stringent values and/or additional conditions are set.

In this manner, at least the condition stricter than the first execution condition is set for the second execution condition. Thus, it can be said that when the second execution condition is satisfied (i.e., when the second automated driving mode is selected as the operation mode), the "reliability" is relatively higher than when only the first execution condition is satisfied (i.e., when the first automated driving mode is selected as the operation mode).

The override conciliating portion 36 executes processing to arbitrate an override request while the automated driving control is being executed (hereinafter also referred to as "override conciliation processing"). Specific example of the override conciliation processing will be described in detail in the section "1.4". Here, the override request will be described. The override request is the involvement of the driver to request a switch from the automated driving to the manual driving (i.e., override).

The override request includes the involvement of the driver for requesting a direct or indirect intervention on the automated driving control. Examples of the direct intervention include an intervention of the steering, the braking or the driving. The examples of the indirect intervention include an intervention impacting the traveling plan, impacting the recognition status of the external sensor 11, or impacting safety of the occupant of the vehicle including the driver. The examples of the intervention impacting the traveling plan include the manipulation of the shifting lever, the EPB switch, and the blinker switch. The examples of the intervention impacting the recognition status include the manipulation of the light switch, the wiper switch and the air conditioner switch. The examples of the intervention impacting the safety include the manipulation of the door lock switch and the electric window switch.

The vehicle control portion 37 executes to control the vehicle in accordance with the driving mode which is currently selected. The vehicle control portion 37 controls the vehicle by transmitting the control signals to the vehicle device. If the automated driving mode is selected as the operation mode, the vehicle control portion 37 executes the automated driving control based on the traveling plan generated by the traveling plan generation portion 33. The vehicle control portion 37 may execute travel assist control if the manual driving mode is selected as the operation mode. Examples of the travel assist control include LDA (Lane Departure Alert) control, LDP (Lane Departure Prevention) control, and PCS (Pre Clash Safety) control.

The alarm control portion 38 executes alarm control designed for the occupant including the driver. In the alarm control, an alarm content is provided to the occupant via the HMI unit 16 when a preset alarm condition in accordance with the alarm content is satisfied. Specific example of the processing of the alarm control will be described in detail in the section "1.5". Here, the alarm content and the alarm condition will be described. The alarm content includes the driving status of the vehicle, the attention-seeking instruction and the handover suggestion. The alarm content also includes the type of driving mode which is currently selected (i.e., the manual or automated driving mode).

The alarm condition includes that at least one of the conditions constituting the first and second execution condition is not satisfied. For example, if the condition V11 is not satisfied, the alarm condition is satisfied. In this case, the alarm control portion 38 transmits to the HMI unit 16 an alarm content "please perform the manual driving because the vehicle travels in the region where the automated driving cannot be executed" (i.e., the handover suggestion). The alarm condition is also satisfied, for example, when the condition D11 is not satisfied. In this case, the alarm control portion 38 transmits to the HMI unit 16 an alarm content "Please grasp the steering wheel to execute the automated driving" (i.e., the attention-seeking instruction).

1.3 Switching Processing

Figure 3:
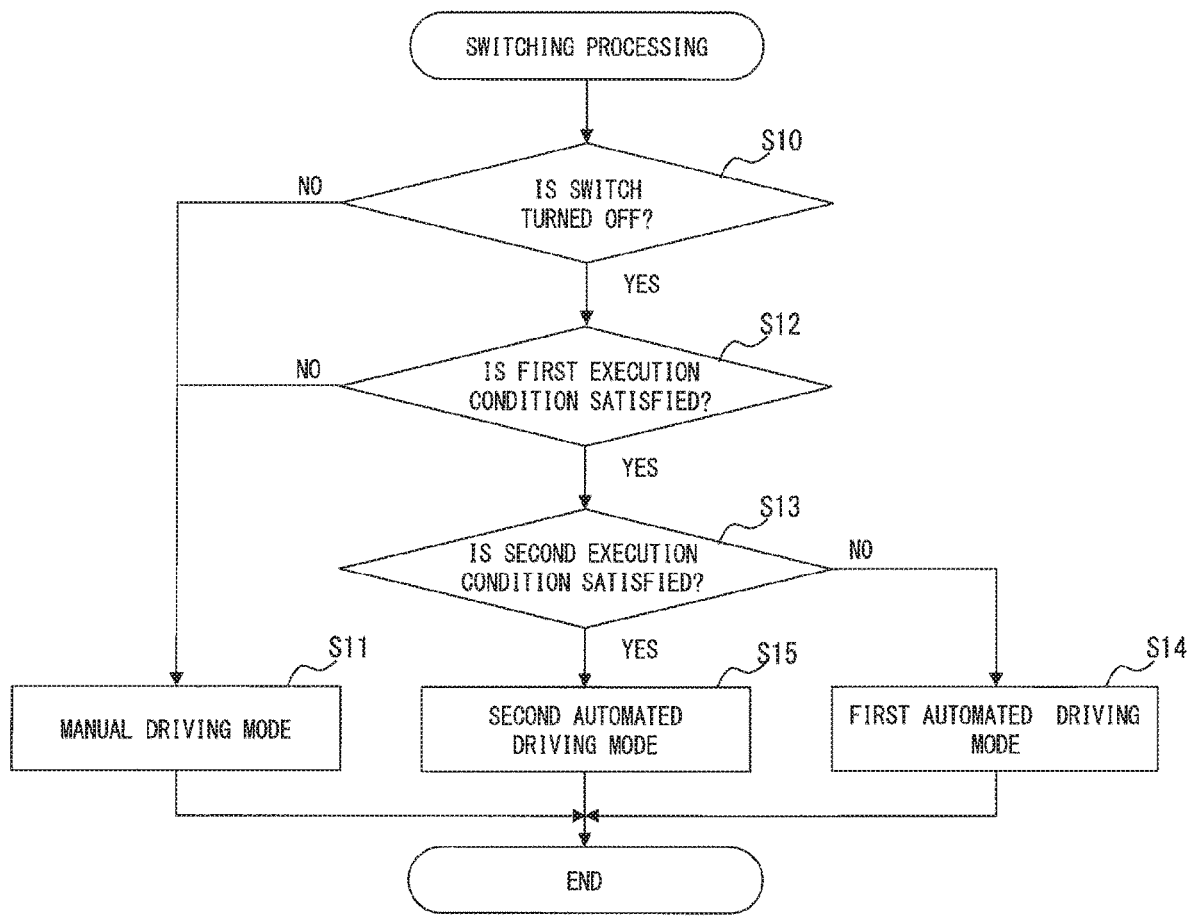
FIG. 3 is a flow chart for explaining a flow of switching processing executed by a mode switching portion in the first embodiment.

FIG. 3 is a flow chart for explaining a flow of the switching processing executed by the mode switching portion 35 in the first embodiment. In the routine shown in FIG. 3, first, it is determined whether or not the cancel switch is turned OFF (step S10). When the cancel switch is turned OFF, it means that the cancel switch is not pressed. The processing of the step S10 is executed based on the signal from the driver operation recognition portion 34. If the determination result of the step S10 is negative, the manual driving mode is selected as the operation mode (step S11).

If the determination result of the step S10 is positive, it is determined whether or not the first execution condition is satisfied (step S12). The first execution condition is as described above. The processing of the step S12 is executed based on the data from the vehicle status recognition portion 31 and the driver status recognition portion 32. If the determination result of the step S12 is negative, the manual driving mode is selected as the operation mode (the step S11).

If the determination result of the step S12 is positive, it is determined whether or not the second execution condition is satisfied (step S13). The second execution condition is as described above. The processing of the step S13 is basically the same as that of the step S12. If the determination result of the step S13 is negative, the first automated driving mode is selected as the operation mode (step S14). For example, when the second automated driving mode is currently selected as the operation mode, the operation mode is switched from the second automated driving mode to the first automated driving mode.

If the determination result of the step S13 is positive, the second automated driving mode is selected as the operation mode in step S15. For example, when the first automated driving mode is currently selected as the operation mode, the operation mode is switched from the first automated driving mode to the second automated driving mode.

1.4 Override Conciliation Processing 1.4.1 Processing Flow

Figure 4:
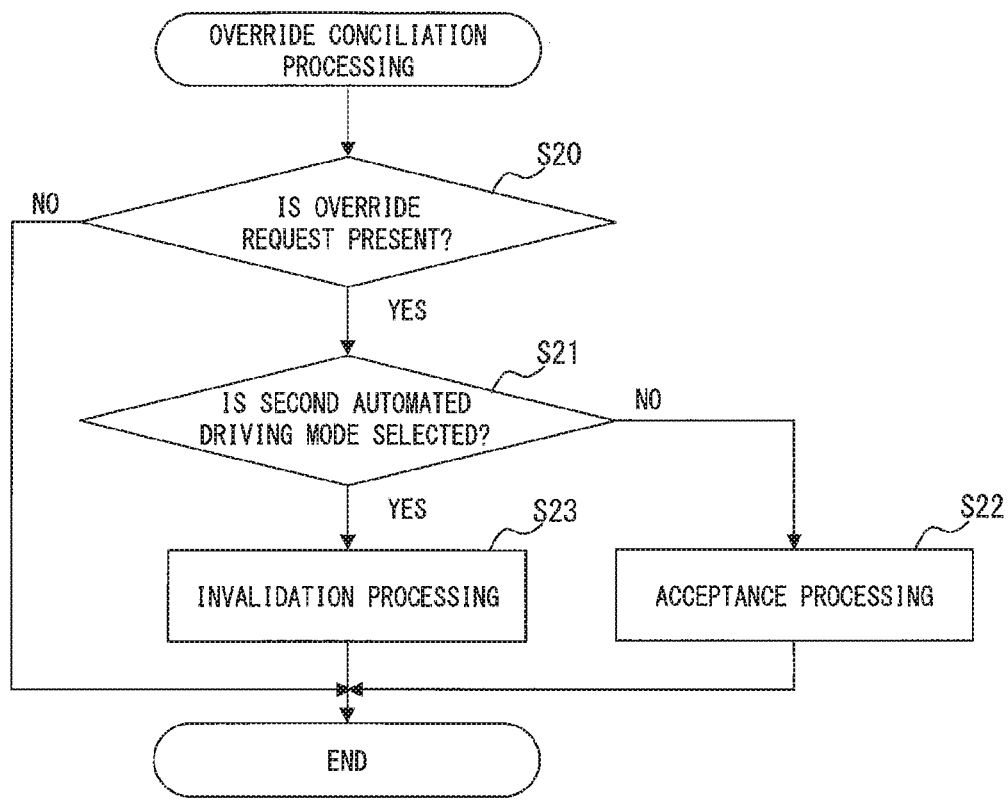
FIG. 4 is a flow chart for explaining the flow of override conciliation processing executed by an override conciliating portion in the first embodiment.

FIG. 4 is a flow chart for explaining the flow of the override conciliation processing executed by the override conciliating portion 36 in the first embodiment. In the routine shown in FIG. 4, first, it is determined whether or not the override request is present (step S20). The processing of the step S20 is executed based on the signals input from the driver operation recognition portion 34 to the override conciliating portion 36. If the determination result of the step S20 is negative, the override conciliation processing is terminated.

If the determination result of the step S20 is positive, it is determined whether or not the second automated driving mode is selected as the operation mode (step S21). The processing of the step S21 is executed based on the signals inputted from the mode switching portion 35 to the override conciliating portion 36. When the determination result of the step S21 is negative (i.e., when the first automated driving mode is selected as the operation mode), acceptance processing of the override request is executed (step S22). The acceptant processing is processing to accept the override request absolutely. According to the acceptance processing, the automated driving control according to the content of the override request is partially and temporarily stopped.

If the determination result of the step S21 is positive, the invalidation processing of the override request is executed (step S23). This invalidation processing will be described below.

1.4.2 Invalidation Processing

Figure 5:
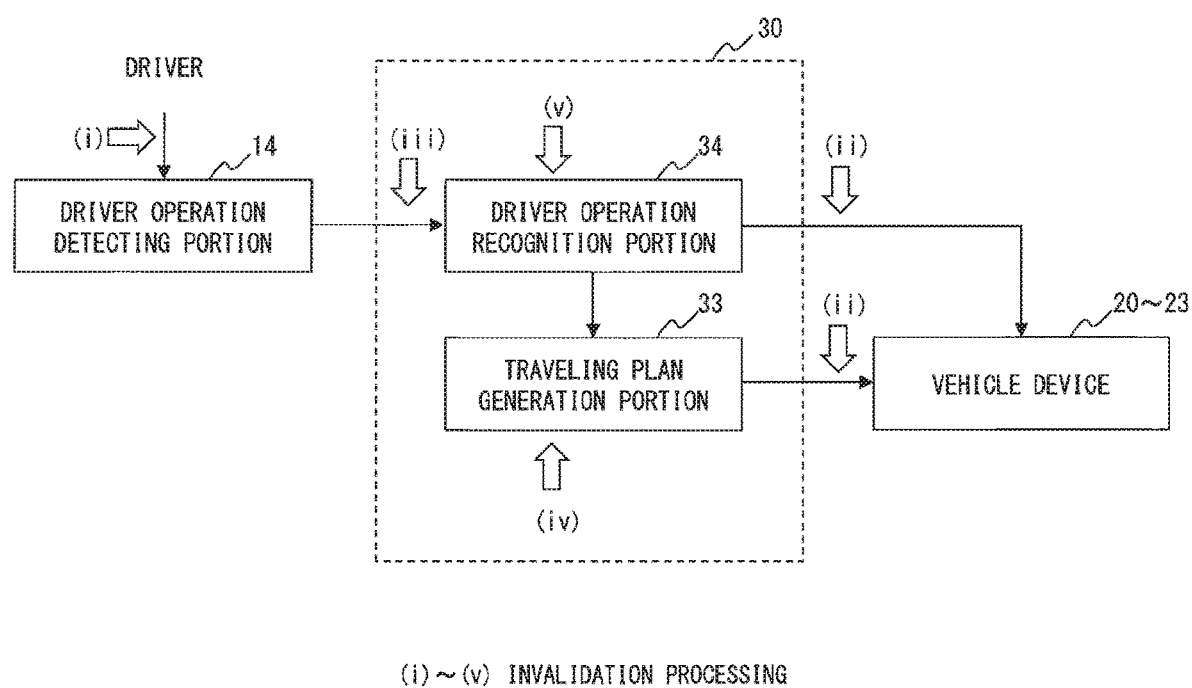
FIG. 5 is a block diagram illustrating invalidation processing.

FIG. 5 is a block diagram illustrating the invalidation processing. FIG. 5 depicts function blocks that are particularly related to the invalidation processing. As shown in FIG. 5, the invalidation processing is distinguished into (i) first type to (v) fifth type depending on a stage at which processing is executed.

(i) First Type

A first type processing is processing to reduce an operability of an operating interface of the vehicle device to be subjected to the override request (hereinafter also referred to as a "request target device") when the determination result of the step S21 is positive. "Reducing operability" means that the operation of the operation interface is made difficult. Therefore, after the processing to reduce the operability, substantially no involvement of the driver is detected in the driver operation detecting portion 14. Therefore, it is recognized that none of the override request is present. According to the processing to reduce the operability, it is possible for the driver to understand that the driving mode which is currently selected is the second automated driving mode.

The processing to reduce operability is as follows, for example. That is, when the operating interface is the steering wheel, the processing is executed to generate a steering reaction force torque being equal to the steering torque input from the driver. Alternatively, the processing is executed to reduce the steering assist torque. This makes it difficult for the driver to manipulate the steering wheel. When the operating interface is the brake pedal, the processing is executed to close a master valve or a holding valve. This makes it difficult for the driver to depress the brake pedal. When the operating interface is the accelerator pedal, the processing is executed to increase a spring force. This makes it difficult for the driver to depress the accelerator pedal.

(ii) Second Type

A second type processing is processing to block a transmission of the override request to the request target device when the determination result of the step S21 is positive. If the transmission is blocked, the override request is not reflected to an operation of the request target device. Here, the first type processing is the processing that makes it difficult to detect the override request, whereas the second type processing allows this detection. Therefore, according to the second type processing, it is possible to extract an intention of the driver and use it for setting of the target route at the next time or generating the traveling plan.

When the request target device is the steering actuator 20, the processing is executed to disconnect with a clutch between the steering wheel and the rack. When the request target device is the brake actuator 21, the processing is executed to open the master valve or the holding valve. When the request target device is the drive actuator 22, the processing is executed to disconnect with a clutch between an output shaft of the engine or the motor and the driving force distribution mechanism. In these cases, however, it is needed to drive a device to ensure the continuation of the automated driving control.

When the request target device is the transmission, the EPB, the directional indicator, the doors, the air conditioner, the lights, the windows, the differential gear or the power circuit, the processing is executed to block the signal from the operating interface from being input to the same request target device. For example, the ON signal output from the blinker switch is not input to the directional indicator. The OFF signal output from the wiper switch during rainfall is not input to the wipers. However, inputs of necessary signals are permitted from a viewpoint for continuing the execution of the automated driving control. The necessary signals include the signal input to the light when the position of the light switch is switched from AUTO to ON.

(iii) Third Type

A third type processing is processing to prohibit the involvement of the driver to the request target device from being processed in the ECU 30 when the determination result of the step S21 is positive. The fact that the processing of the involvement of the driver to the request target device is prohibited means that the involvement of the driver determined to be override request prior to the prohibition is not processed at all after the prohibition. Therefore, according to the third type processing, it is possible to invalidate the override request very easily.

(iv) Fourth Type

A fourth type processing is processing to prohibit the current traveling plan from being modified in the traveling plan generation portion 33 when the determination result of the step S21 is positive. If the modification of the current traveling plan is prohibited, the automated driving control based on the present traveling plan is continued.

(v) Fifth Type

Prior to describing a fifth type processing, a relationship between the switching of the operation mode and the override request will be described. If the driver operation recognition portion 34 does not recognize the override request, the switching of the operation mode is executed in accordance with the switching processing. However, after the driver operation recognition portion 34 recognizes the override request, the operation mode is switched in accordance with the override conciliation processing (more precisely, the acceptance processing).

The fifth type processing is processing to prohibit the operation mode from being switched to the manual driving mode based on the override request when the determination result of the step S21 is positive. If the switching of the operation mode is prohibited, the operation mode is maintained at the second automated driving mode.

The prohibition of the switching of the operation mode may be realized by setting the threshold (i.e., the determination value) for the driver operation recognition portion 34 to recognize the override request to a stricter one. When such the stricter threshold is set, the involvement of the driver which was determined to be the override request before the setting is not recognized after the setting. Then, the operation mode is not switched in the override conciliation processing after the setting.

1.5 Alarm Control

Example of the alarm control particularly related to the automated driving control includes a first alarm control and a second alarm control. These alarm controls will be described below.

1.5.1 First Alarm Control

Figure 6:
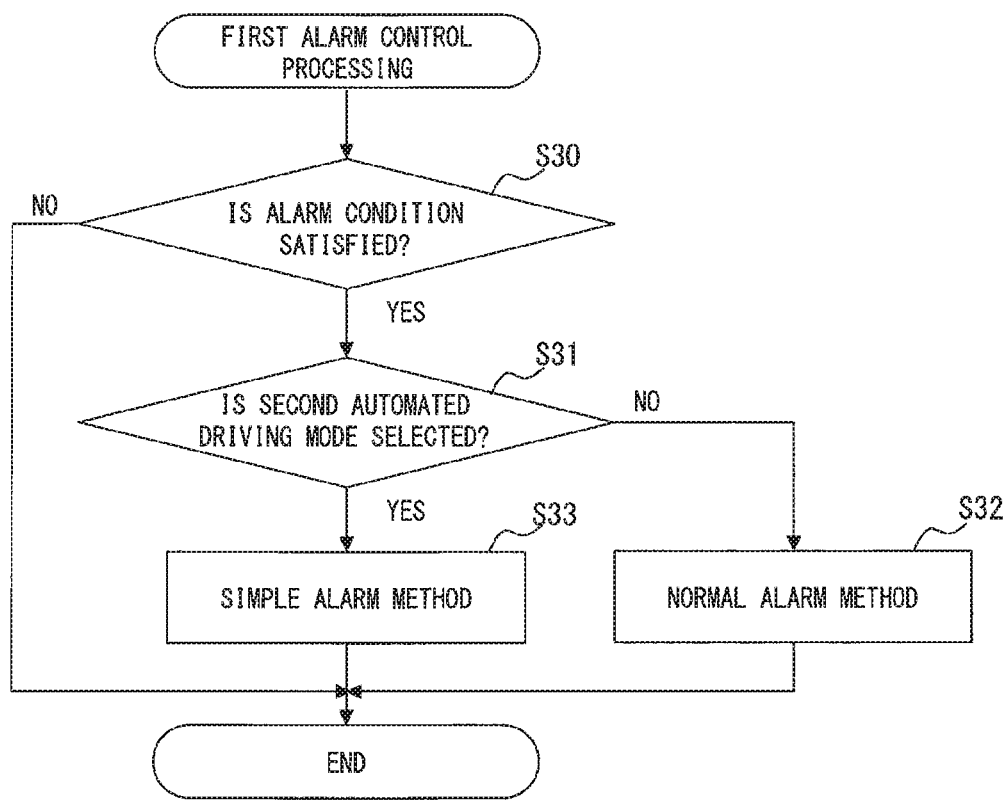
FIG. 6 is a flow chart for explaining the flow of first alarm control processing executed by an alarm control portion in the first embodiment.

FIG. 6 is a flow chart for explaining the flow of the first alarm control processing executed by the alarm control portion 38 in the first embodiment. In the routine shown in FIG. 6, first, it is determined whether or not the alarm condition is satisfied (step S30). The alarm condition is as described above. The processing of the step S30 is executed based on the data from the vehicle status recognition portion 31 and the driver status recognition portion 32. If the determination result of the step S30 is negative, the first alarm control processing is terminated.

If the determination result of the step S30 is positive, the processing of the step S31 is executed. The processing of the step S31 is the same as the processing of the step S21 shown in FIG. 4. If the determination result of the step S31 is negative, a normal alarm method is adopted (step S32). The normal alarm method is a method to provide all of the preset alarm content to the occupant.

If the determination result of the step S31 is positive, a simple alarm method is adopted (step S33). The simple alarm method is a method in which some or all of the alarm contents to the occupant are omitted, or some or all of the alarm devices are omitted at the alarm to the occupant. The alarm device includes the display device and the speaker of the HMI unit 16.

The omission of some of the alarm device means that a part of the alarm devices (e.g., the speaker) which was used in the normal alarm method is excluded to use.

1.5.1 Second Alarm Control

Figure 7:
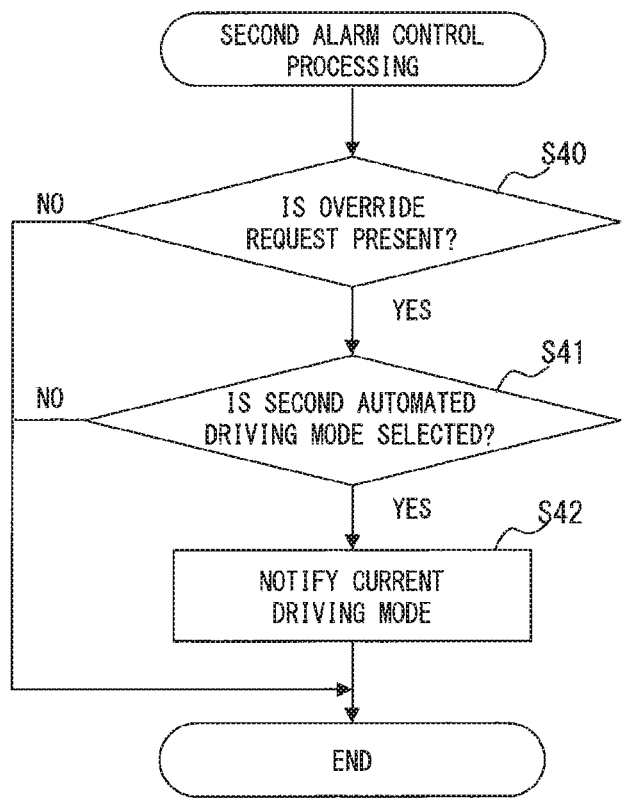
FIG. 7 is a flow chart for explaining the flow of second alarm control processing executed by the alarm control portion in the first embodiment.

FIG. 7 is a flow chart for explaining the flow of the second alarm control processing executed by the alarm control portion 38 in the first embodiment. In the routine shown in FIG. 7, first, the processing of the step S40 is executed. The processing of the step S40 is the same as that of the step S20 shown in FIG. 4. If the determination result of the step S40 is negative, the second alarm control processing is terminated.

If the determination result of the step S40 is positive, the processing of the step S41 is executed. The processing of the step S41 is the same as that of the step S21 shown in FIG. 4. If the determination result of the step S41 is negative, the second alarm control processing is terminated.

If the determination result of the step S41 is positive, the driving mode which is currently selected is notified (step S42). Thus, the driver understands via the alarm device that the driving mode which is currently selected is the second automated driving mode.

1.6 Advantageous Effects

According to the vehicle control system according to the first embodiment described above, the override conciliation processing is executed. According to the override conciliation processing, it is possible to make it easier to accept the override request when the "reliability" low first automated driving mode is selected. Also, it is possible to make it difficult to accept it when the "reliability" high second automated driving mode is selected. Therefore, in the vehicle where two types of the automated driving mode differing in the "reliability" are applied, it is possible to suppress the driver from feeling of the strangeness about the ease of override.

According to the vehicle control system of the first embodiment, the invalidation processing or the acceptance processing is executed in the override conciliation processing. According to the invalidation processing, the driver intervention is eliminated that may disturbance the automated driving control during the "reliability" high second automated driving mode is selected. Therefore, it is possible to enhance controllability of the automated driving control. According to the acceptance processing, it is possible to leave a chance for the driver an intervention to the automated driving control during the "reliability" low first automated driving mode is selected.

According to the vehicle control system of the first embodiment, the alarm control is executed. According to the alarm control, the normal alarm method is adopted when the "reliability" low first automated driving mode is selected. Also, the simple alarm method is adopted when the "reliability" high second automated driving mode is selected. When viewed as an alarm level, the level of the simple alarm method is lower than that of the normal alarm method. However, when the alarm level is lowered, it is expected that a frequency of the driver intervention for the automated driving control is reduced. Therefore, it is possible to enhance the controllability of the automated driving control when the "reliability" high second automated driving mode is selected.

2. Second Embodiment

Next, a second embodiment will be described with reference to FIGS. 8 to 10. Hereinafter, descriptions overlapping with those of the first embodiment described above will be omitted as appropriate.

2.1 Configuration of Controller

In the first embodiment described above, the override conciliating portion 36 was subjected to override conciliation processing. In the second embodiment, the override conciliating portion 36 executes, in addition to the override conciliation processing, processing to cancel the invalidation processing (hereinafter referred to as "cancel processing"). The cancel processing includes first cancel processing, second cancel processing, and third cancel processing. These cancel processing will be described below.

2.1.1 First Cancel Processing

Figure 8:
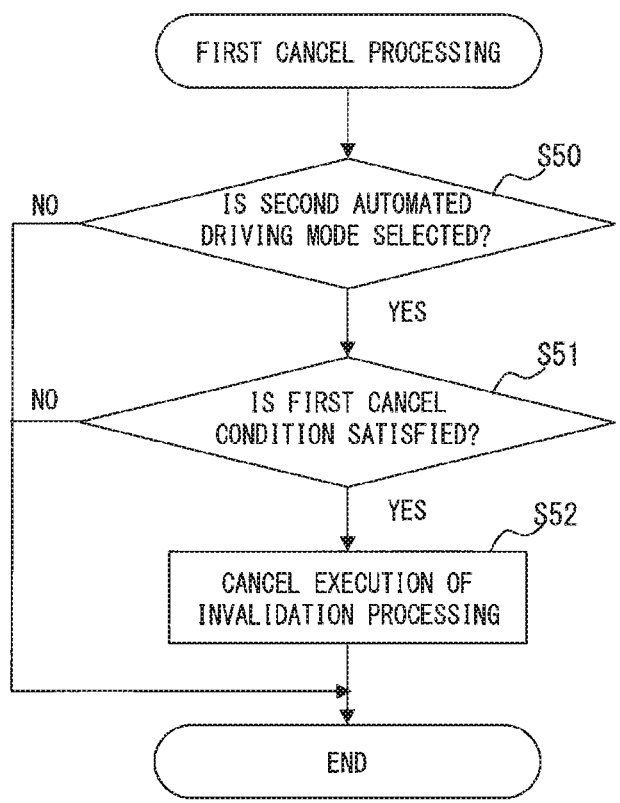
FIG. 8 is a flow chart for explaining the flow of first cancel processing executed by an override conciliating portion in a second embodiment.

FIG. 8 is a flow chart for explaining the flow of the first cancel processing executed by the override conciliating portion 36 in the second embodiment. In the routine shown in FIG. 8, first, the processing of the step S50 is executed. The processing of the step S50 is the same as that of the step S21 shown in FIG. 4. If the determination result of the step S50 is negative, the first cancel processing is terminated.

If the determination result of the step S50 is positive, it is determined whether or not the first cancel condition is satisfied (step S51). Examples of the first cancel condition include a condition "the cancel switch of the invalidation processing is pressed". The cancel switch is a device for outputting a signal based the manipulation by the driver. This cancel switch is different from that for switching the working status of the automated driving mode. Hereinafter, for convenience of explanation, the cancel switch for the working status is referred to as a "first switch", and the cancel switch for the invalidation processing is referred to as a "second switch".

The second switch is also the cancel switch for switching an execution status (e.g., ON and OFF) of the invalidation processing. The second switch is provided next to the first switch, for example. In order to reliably detect the intention of the driver, the second switch may consist of two buttons. When the first switch is pressed, the working state of the automated driving mode is turned OFF. Therefore, in this case, the processing of the step S50 is repeated, and that of the step S51 is not executed.

If the determination result of the step S51 is negative, the first cancel processing is terminated. If the determination result is positive, the execution of the invalidation processing is canceled (step S52). The cancel of the invalidation processing means that the acceptance processing described in the step S22 of FIG. 4 is executed. By the execution of the acceptance processing, the override request is absolutely accepted even when the second automated driving mode is selected.

2.1.2 Second Cancel Processing

Figure 9:
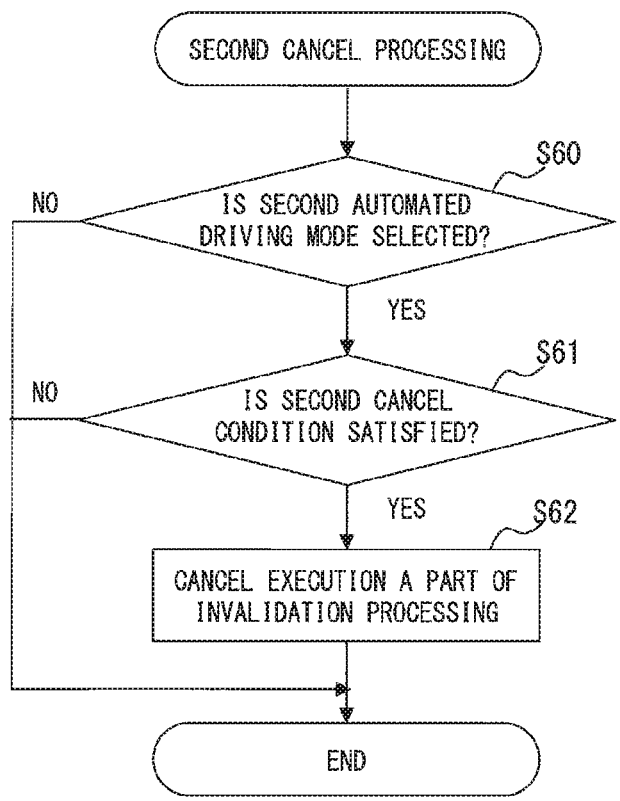
FIG. 9 is a flow chart for explaining the flow of second cancel processing executed by the override conciliating portion in the second embodiment.
Figure 10:
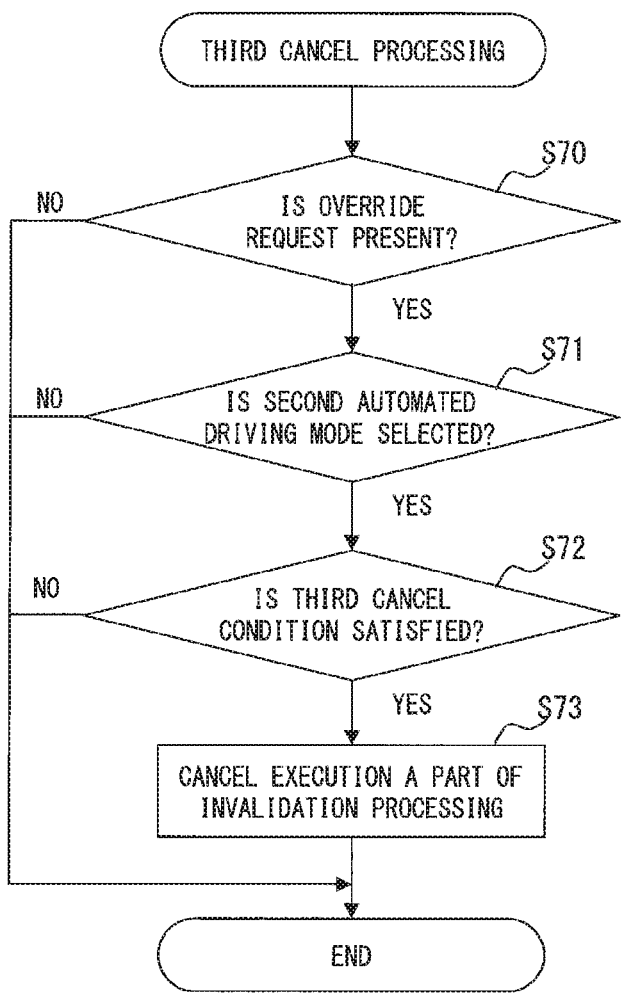
FIG. 10 is a flow chart for explaining the flow of third cancel processing executed by the override conciliating portion in the second embodiment.

FIG. 9 is a flow chart for explaining the flow of second cancel processing executed by the override conciliating portion 36 in the second embodiment. In the routine shown in FIG. 9, first, the processing of the step S60 is executed. The processing of the step S60 is the same as that of the step S21 shown in FIG. 4. If the determination result of the step S60 is negative, the second cancel processing is terminated.

If the determination result of the step S60 is positive, it is determined whether or not the second cancel condition is satisfied (step S61). Examples of the second cancel condition include a condition "all of the conditions constituting the first execution condition are satisfied, but a part of the conditions constituting the second execution condition is not satisfied". As described above, at least the condition stricter than the first execution condition is set for the second execution condition. Therefore, there is a case where the second cancel condition is satisfied.

If the determination result of the step S61 is negative, the second cancel processing is terminated. If the determination result of the step S61 is positive, the execution of a part of the invalidation processing is canceled (step S62). The range to be cancelled is set to the vehicle device included in a device range in which the second cancel condition is satisfied. For example, when the second execution condition other than the condition V12 is satisfied, the range to be cancelled is the device range up to the brake pedal. When the second execution condition other than the condition V13 is satisfied, the range to be cancelled is the device range up to the steering wheel.

2.1.3 Third Cancel Processing

Unlike the first and second cancel processing, the third cancel processing is executed when the override request is present. FIG. 10 is a flow chart for explaining the flow of the third cancel processing executed by the override conciliating portion 36 in the second embodiment. In the routine shown in FIG. 10, first, the processing of steps S70 and S71 is executed. The processing of the steps S70 and S71 is the same as that of the steps S20 and S21 shown in FIG. 4.

If the determination result of the step S70 or S71 is negative, the third cancel processing is terminated. If these determination results are positive, it is determined whether or not the third cancel condition is satisfied (step S72).

As the third cancel condition, the following conditions C31 to C36 are exemplified.

C31: The involvement of the driver as the basis for the override request is continuously recognized.

C32: The involvement of the driver as the basis for the override request coincides with the operation of the vehicle based on the automated driving control.

C33: The involvement of the driver as the basis for the override request coincides with the operation of the vehicle based on the automated driving control and is recognized earlier than a timing at which the same operation of the vehicle is started.

C34: The involvement of the driver as the basis for the override request is due to the moving obstruction (e.g., a walker or a bicycle) jumping out of a blind spot of the vehicle.

C35: A collision with the obstruction is unavoidable.

C36: A collision with the obstruction is unavoidable, and also the involvement of the driver as the basis for the override request is most appropriate operation from a viewpoint of suppressing damage in the collision.

The determination processing of the condition C31 is executed based on the signal input from the driver operation recognition portion 34 to the override conciliating portion 36. The determination processing of the operation of the vehicle based on the automated driving control in the conditions C32 and C33 is executed based on the current traveling plan. The determination processing of the timing at which the operation of the vehicle is started in the condition C33 is also executed based on the current traveling plan. The determination processing of the jump in the condition C34 is executed based on the data from the external sensor 11. The determination processing of the condition C35 is executed based on the current traveling plan and the data from the external sensor 11. The determination processing of the validity of the involvement of the driver in the condition C36 is executed based on a preset evaluation model.

If the determination result of the step S72 is negative, the third cancel processing is terminated. If the determination result is positive, the execution of a part of the invalidation processing is canceled (step S73). The range to be cancelled is set to the vehicle device included in a device range in which the third cancel condition is satisfied. For example, when the steering wheel is manipulated, the range to be cancelled is the device range up to the steering wheel. When both the steering wheel and the brake pedal are manipulated, the range to be cancelled is the device range up to these vehicle devices.

In the processing of the step S73, a rate at which the invalidation processing is canceled may be changed in accordance with the content of the third cancel condition. For example, when any one of the conditions C34 to C36 is satisfied, it is estimated that an emergency of the override is higher than that in a case where any one of conditions C31 to C33 is satisfied. Therefore, in such an emergency, the invalidation processing may be cancelled in a shorter time than usual time.

2.2 Advantageous Effect

In the vehicle control system according to the first embodiment described above, the second automated driving mode was selected as the operation mode when all the conditions constituting the second execution condition were satisfied. Therefore, when a part of the condition constituting the second execution condition is not satisfied, the first automated driving mode (or the manual driving mode) is selected as the operation mode.

On the other hand, according to the vehicle control system of the second embodiment, the cancel processing is executed. According to the cancel processing, it is possible to cancel the execution of the invalidation processing with respect to the vehicle device in which the cancel condition is satisfied. Therefore, during the "reliability" high second automated driving mode is selected, it is possible to leave to the driver the operation of the vehicle device belonging to the device range in which the cancel condition is satisfied.

3. Third Embodiment

Next, a third embodiment will be described with reference to FIGS. 11 to 13. Hereinafter, descriptions overlapping with those of the first and second embodiments described above will be omitted as appropriate.

3.1 Entire Configuration of Vehicle Control System

Figure 11:
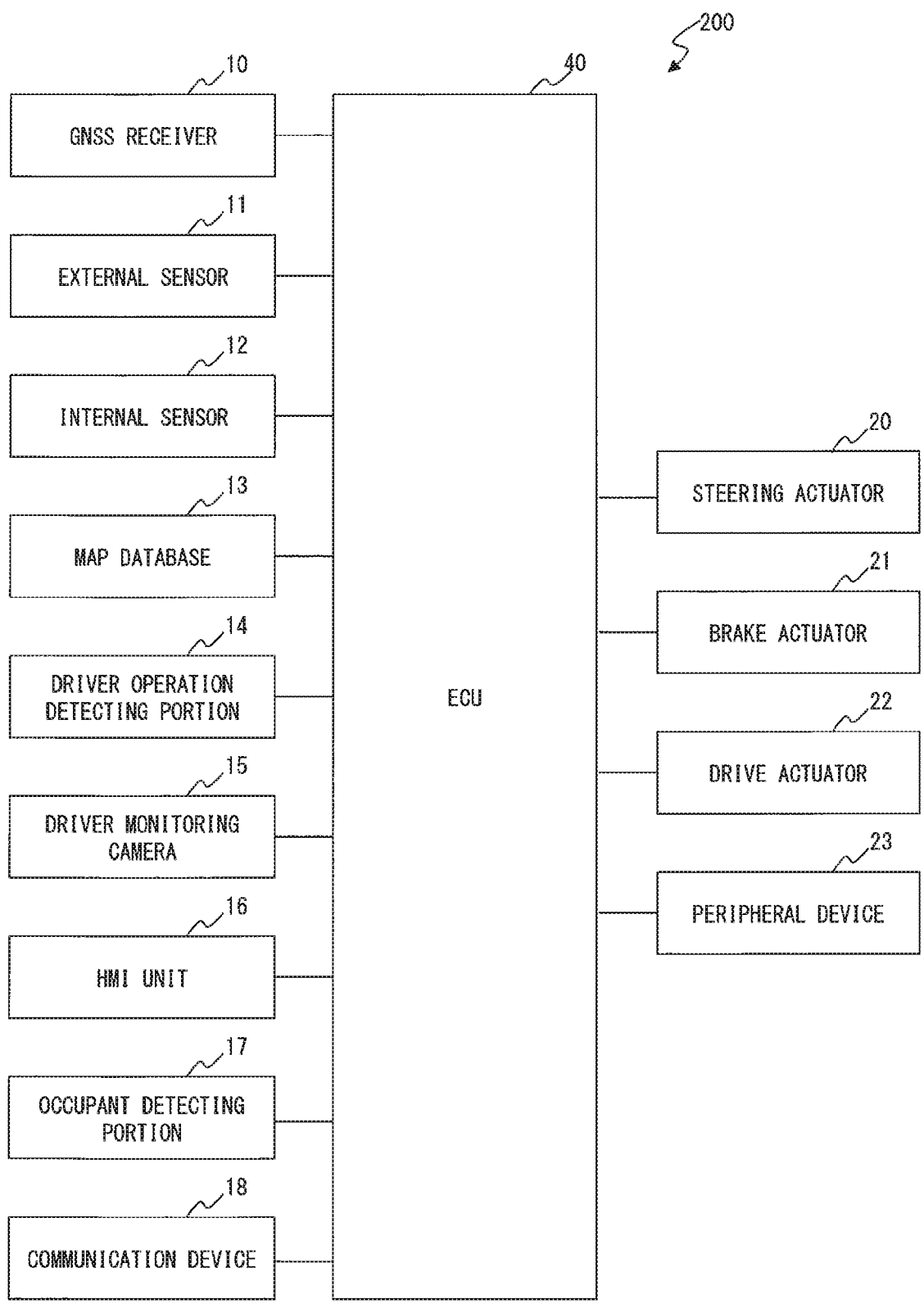
FIG. 11 is a block diagram showing a configuration example of a vehicle control system according to a third embodiment.

FIG. 11 is a block diagram showing a configuration example of the vehicle control system according to the third embodiment. A vehicle control system 200 shown in FIG. 11 includes an occupant detecting portion 17, a communication device 18 and an ECU 40. Other configurations of the vehicle control system 200 are the same those of the vehicle control system 100 shown in FIG. 1

The occupant detecting portion 17 is a device which detects the occupant. Examples of the occupant detecting portion 17 include a seat sensor, an indoor monitoring camera and a breath detection sensor. The seat sensor detects whether or not the occupant are seated. The seat sensor is provided for each of seats. The indoor monitoring camera is a camera which captures an interior of the vehicle. The indoor monitoring camera may be provided for each seat except for the driver's seat, or may be provided at a location overlooking the interior of the vehicle. The breath detection sensor detects exhalation of the driver. The breath detection sensor is attached to the covers of the steering columns. The occupant detecting portion 17 transmits the detected data to the ECU 40.

The communication device 18 is a device that performs wireless communication with a nearest base station and connects to networks via the base station. Examples of a communication standard of the wireless communication used by the communication device 18 include mobile communication standards such as 4G, LTE, and 5G.

A connection point of the communication device 18 on the networks is, for example, an external management server. The management server is a computer including at least one processor and at least one memory. The management server includes a storage device (e.g., a SSD and a HDD). The storage device stores ID data of user of the vehicle. The identification information includes data of the user's face photo and information on driver license. The information on driver license includes presence or absence of the driver license, an expiration date of the driver license, and a vehicle type that can be driven by the user (e.g., normal vehicle and commercial vehicle).

Consider a case where the vehicle control system 200 is mounted on a vehicle provided for ride-share service. In this case, the ID data includes face photo data of the user of the ride-share service, and information on use of baggage compartment of the vehicle (e.g., a trunk) by the same user.

Consider a case where the vehicle control system 200 is mounted on a remotely operated vehicle. In this case, another connection point of the communication device 18 on the networks is, for example, an external management center. The management center monitors the execution status of the automated driving control. The management center performs remote control of the vehicle as required.

The ECU 40 is a microcomputer that includes a processor, a memory, and an input interface and an output interface. The basic function of the ECU 40 is the same as that of the ECU 30 shown in FIG. 1. Hereinafter, a configuration of the ECU 40 will be described.

3.2 Configuration of Controller

Figure 12:
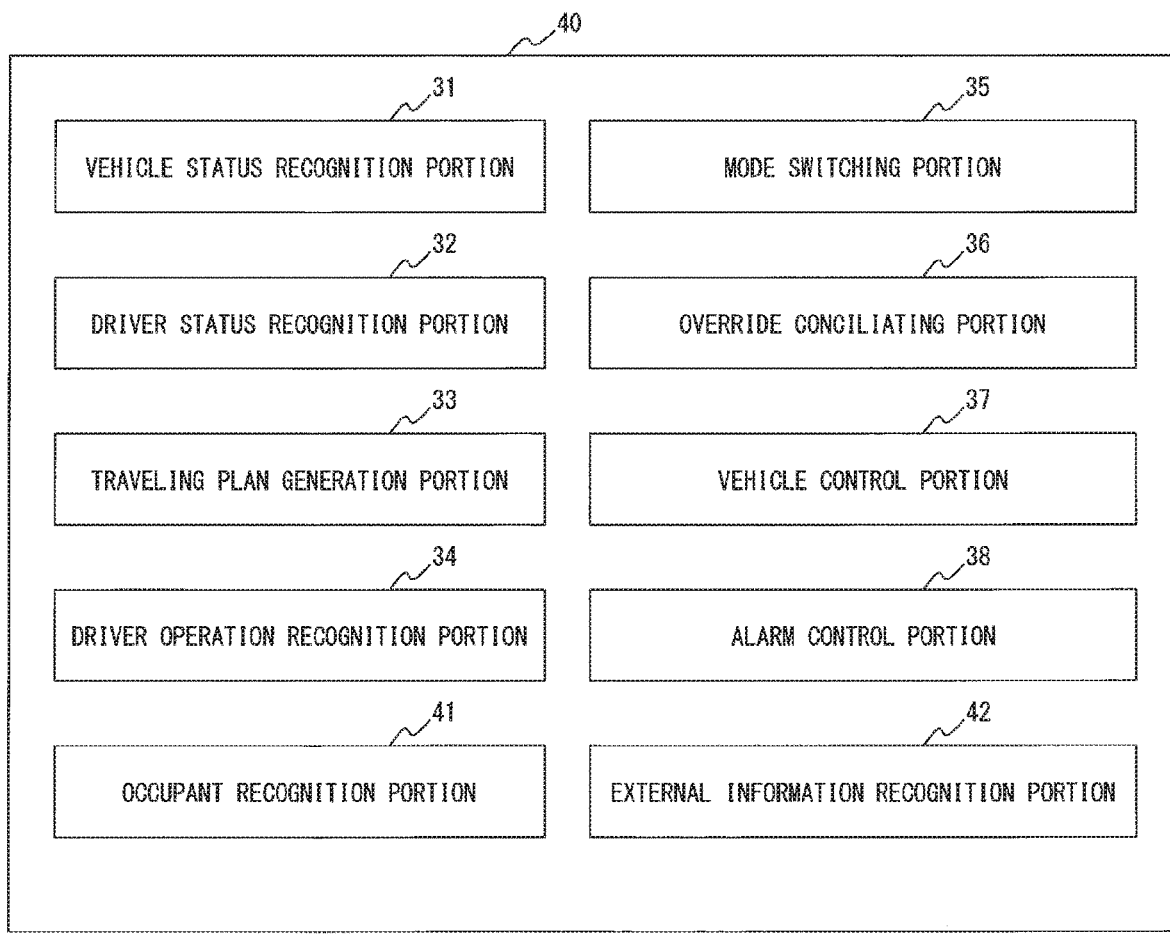
FIG. 12 is a block diagram showing a functional configuration example of the controller related to the automated driving control.

FIG. 12 is a block diagram showing a functional configuration example of the ECU 40 relate to the automated driving control. As shown in FIG. 12, the ECU 40 includes an occupant recognition portion 41 and an external information recognition portion 42. The other function blocks of the ECU 40 are the same as those of the ECU 30 shown in FIG. 2. These function blocks are realized when the processor of the ECU 40 executes various types of the control programs stored in the memory.

The occupant recognition portion 41 recognizes the occupant in a cabin based on the data from the occupant detecting portion 17. The occupant recognition portion 41 recognizes the presence or absence of the occupant on the seats based on the data from the seat sensor. The occupant recognition portion 41 verifies the occupant of the respective seats based on the shooting information from the indoor monitoring camera and the ID data from the external information recognition portion 42. The driver may be verified based on the shooting data from the driver monitoring camera 15.

The external information recognition portion 42 recognizes external information acquired by the communication device 18. The external information includes the ID data of the vehicle user. If the vehicle is provided for ride-sharer service, the external information includes the ID data of the ride-share service user. When the vehicle is remotely operated, the external information includes remote control data.

3.3 Configuration of Override Conciliating Portion

Likewise the second embodiment described above, the override conciliating portion 36 executes the cancel processing. The cancel processing includes the first, second and third cancel processing described above. The basic flow of these cancel processing is the same as that in the second embodiment described above. Hereinafter, the first cancel processing will be described as the representative of these cancel processing.

Figure 13:
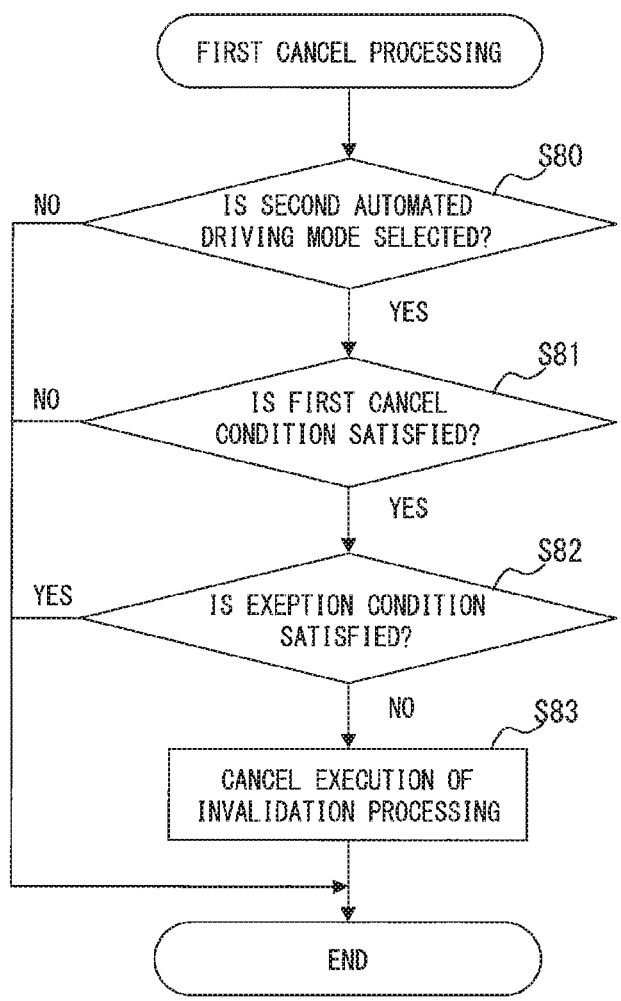
FIG. 13 is a flow chart for explaining the flow of first cancel processing executed by an override conciliating portion in the third embodiment.

FIG. 13 is a flow chart for explaining the flow of the first cancel processing executed by the override conciliating portion 36 in the third embodiment. In the routine shown in FIG. 13, first, the processing of steps S80 and S81 is executed. The processing of steps S80 and S81 is the same as that of the steps S50 and S51 shown in FIG. 8

If the determination result of the step S80 or step S81 is negative, the first cancel processing is terminated. If these determination result are positive, it is determined whether or not the exception condition is satisfied (step S82).

As the exception condition, the following conditions E11 to E14 are exemplified.

E11: There is a restriction on a road along which the vehicle is traveling (e.g., the road is a dedicated road for automated driving).

E12: There is a restriction on the driving environment (e.g. a distance between the vehicle and the obstruction in the transverse direction or the longitudinal direction is less than a threshold).

E13: There is no person with the manual driving ability or qualification in the cabin (e.g., driving license holder is not on board, the holder does not seat on the driver's seat, or the driver is drunk).

E14: There is no occupant in the cabin having ID and face photo data match with the registered data.

The determination processing of the condition E11 is executed based on the map information. The determination processing of the condition E12 is executed based on the data from the external sensor 11. The determination processing of the conditions E13 and E14 is executed based on the data from the driver status recognition portion 32, the occupant recognition portion 41 and the external information recognition portion 42.

When the vehicle is provided for the ride-share service, the following conditions E21 and E22 are exemplified as the exception condition.

E21: The baggage compartment is used.

E22: The occupant seated on the driver's seat does not match with the occupant who uses the baggage compartment.

When the vehicle is operated remotely, the following conditions E31 and E32 are exemplified as the exception condition.

E31: No person other than a caretaker and a care-recipient is present in the cabin.

E32: No person other than the care-recipient is present in the cabin.

The determination processing of the conditions E21, E22, E31 and E32 is executed based on the data from the driver status recognition portion 32, occupant recognition portion 41 and the external information recognition portion 42.

If the determination result of the step S82 is negative, the execution of the invalidation processing is canceled (step S83). That is, the acceptance processing described in the step S22 shown in FIG. 4 is executed. If this determination result of the step S82 is positive, the first cancel processing is terminated. In other words, the cancellation of executing the invalidation processing is rejected.

3.4 Advantageous Effects

According to the vehicle control system of the third embodiment, when it is determined that the exception condition is satisfied, the cancellation of executing the invalidation processing is rejected. Therefore, even when the cancel condition is satisfied, if the handover request should not be accepted, the invalidation processing can be executed as originally planned.

What is claimed is:

1. A vehicle control system mounted on a vehicle, comprising a controller which is configured to execute automated driving control of the vehicle, wherein, the controller is further configured to:
    select a first or second automated driving mode as an operation mode for executing the automated driving control, the first automated driving mode is based on a first driver condition and a first vehicle condition and the second automated driving mode is based on a second driver condition and a second vehicle condition, the second driver condition is a stricter condition than the first driver condition such that when the second driver condition is satisfied, the first driver condition is satisfied, and the second vehicle condition is a stricter vehicle condition than the first vehicle condition such that when the second vehicle condition is satisfied, the first vehicle condition is satisfied; and
    during the execution of the automated driving control, execute override conciliation processing to conciliate an override request from a driver of the vehicle,
wherein, in the override conciliation processing, the controller is configured to:
    determine which of the first and second automated driving mode is selected;
    when it is determined that the second automated driving mode is selected, make it more difficult to accept the override request than a case where it is determined that the first automated driving mode is selected;
    during the execution of the automated driving control, determine whether or not a cancel condition for canceling an execution of an invalidation processing to invalidate the override request is satisfied,
    when it is determined that the cancel condition is satisfied, cancel the execution of the invalidation processing on a vehicle device belonging to a range of device type where the cancel condition is satisfied; and
    execute an alarm control for an occupant of the vehicle during the execution of the automated driving control,
wherein, in the alarm control, the controller is further configured to:
    determine which of the first and second automated driving mode is selected; and
    when it is determined that the second automated driving mode is selected, an alarm level for the occupant is lowered as compared with that when it is determined that the first automated driving mode is selected.

2. The vehicle control system according to claim 1, wherein, the controller is further configured to execute the invalidation processing to invalidate the override request when it is determined in the override conciliation processing that the second automated driving mode is selected.

3. The vehicle control system according to claim 2, further comprising a detection device which is configured to detect the override request,
wherein, in the invalidation processing, the controller is further configured to inhibit the override request from being input into the detection device.

4. The vehicle control system according to claim 2,
wherein, in the invalidation processing, the controller is further configured to block the override request from being transmitted to a vehicle device as a target of the override request.

5. The vehicle control system according to claim 2,
wherein, in the invalidation processing, the controller is further configured to prohibit the override request from being processed in the controller.

6. The vehicle control system according to claim 2,
wherein, in the invalidation processing, the controller is further configured to prohibit a current traveling plan of the vehicle from being modified based on the override request.

7. The vehicle control system according to claim 2,
wherein, in the invalidation processing, the controller is further configured to prohibit a switch of the operation modes based on the override request.

8. The vehicle control system according to claim 1,
wherein, in the override conciliation processing, the controller is further configured to accept the override request when it is determined in the override conciliation processing that the first automated driving mode is selected.

9. The vehicle control system according to claim 1,
wherein the controller is further configured to:
during the execution of the automated driving control, determine whether or not an exception condition for rejecting the cancellation of the execution of the invalidation processing is satisfied; and
when it is determined that the exception condition is satisfied, reject the cancellation of the execution of the invalidation processing on a vehicle device belonging to a range of device type where the exception condition is satisfied.

10. A method of executing an automated driving control of a vehicle, the method comprising:
selecting a first or second automated driving mode as an operation mode for executing the automated driving control, the first automated driving mode is based on a first driver condition and a first vehicle condition and the second automated driving mode is based on a second driver condition and a second vehicle condition, the second driver condition is a stricter condition than the first driver condition such that when the second driver condition is satisfied, the first driver condition is satisfied, and the second vehicle condition is a stricter vehicle condition than the first vehicle condition such that when the second vehicle condition is satisfied, the first vehicle condition is satisfied;
during the execution of the automated driving control, executing override conciliation processing to conciliate an override request from a driver of the vehicle,
wherein, in the override conciliation processing, determining which of the first and second automated driving mode is selected;
when it is determined that the second automated driving mode is selected, making it more difficult to accept the override request than a case where it is determined that the first automated driving mode is selected
during the execution of the automated driving control, determining whether or not a cancel condition for canceling an execution of an invalidation processing to invalidate the override request is satisfied,
when it is determined that the cancel condition is satisfied, canceling the execution of the invalidation processing on a vehicle device belonging to a range of device type where the cancel condition is satisfied; and
executing an alarm control for an occupant of the vehicle during the execution of the automated driving control,
wherein, in the alarm control, determining which of the first and second automated driving mode is selected; and
when it is determined that the second automated driving mode is selected, an alarm level for the occupant is lowered as compared with that when it is determined that the first automated driving mode is selected.

11. The method according to claim 10, further comprising:
executing invalidation processing to invalidate the override request when it is determined in the override conciliation processing that the second automated driving mode is selected;
in the invalidation processing, blocking the override request from being transmitted to a vehicle device as a target of the override request; and
in the invalidation processing, prohibiting a current traveling plan of the vehicle from being modified based on the override request.

12. The method according to claim 11, further comprising:
a detection device configured to detect the override request,
wherein, in the invalidation processing, inhibiting the override request from being input into the detection device.

13. The method according to claim 11, wherein, in the invalidation processing, prohibiting the override request from being processed.

14. The method according to claim 11, wherein, in the invalidation processing, prohibiting a switch of the operation modes based on the override request.

15. The method according to claim 11, wherein, in the override conciliation processing, accepting the override request when it is determined in the override conciliation processing that the first automated driving mode is selected.

16. The method according to claim 10, wherein:
during the execution of the automated driving control, determining whether or not an exception condition for rejecting the cancellation of the execution of the invalidation processing is satisfied; and
when it is determined that the exception condition is satisfied, rejecting the cancellation of the execution of the invalidation processing on a vehicle device belonging to a range of device type where the exception condition is satisfied.

* * * * *